(12) United States Patent
Yano (10) Patent No.: US 10,300,645 B2
(45) Date of Patent: May 28, 2019

(54) INJECTION DEVICE AND AXIAL-CENTER POSITION ADJUSTING METHOD

(71) Applicant: FANUC CORPORATION, Yamanashi (JP)

(72) Inventor: Satoshi Yano, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/819,638

(22) Filed: Nov. 21, 2017

(65) Prior Publication Data

US 2018/0141251 A1     May 24, 2018

(30) Foreign Application Priority Data

Nov. 22, 2016   (JP) ................................. 2016-226993

(51) Int. Cl.
     *B29C 45/46*      (2006.01)
     *B29C 45/50*      (2006.01)

(52) U.S. Cl.
     CPC .. B29C 45/5008 (2013.01); *B29C 2045/5048* (2013.01)

(58) Field of Classification Search
     CPC ........ B29C 45/5008; B29C 2045/5048; B29C 2045/504; B29C 2045/5044; B29C 2045/5052; B29C 2045/5056; B29C 2045/506; B29C 2045/5064; B29C 2045/5068; B29C 2045/5072; B29C 2045/508; B29C 2045/5076; B29C 2045/5084; B29C 2045/5088; B29C 2045/5092; B29C 2045/5096

See application file for complete search history.

(56) References Cited

U.S. PATENT DOCUMENTS

| | | | | |
|---|---|---|---|---|
| 3,883,047 | A | * 5/1975 | Hofer | ................. B29C 45/5008 222/413 |
| 4,540,359 | A | * 9/1985 | Yamazaki | ........... B29C 45/4005 425/135 |
| 4,693,676 | A |    9/1987 | Inaba | |
| 5,421,712 | A | * 6/1995 | Laing | ................. B29C 45/5008 264/40.7 |

(Continued)

FOREIGN PATENT DOCUMENTS

| CN | 104884225 A | 9/2015 |
|---|---|---|
| CN | 105479666 A | 4/2016 |

(Continued)

*Primary Examiner* — Alison L Hindenlang
*Assistant Examiner* — Emmanuel S Luk
(74) *Attorney, Agent, or Firm* — Hauptman Ham, LLP (57) ABSTRACT

An injection device includes a spline supporting member rotatably supporting a spline shaft and attached to a pressure plate, and a nut supporting member rotatably supporting a spline nut and attached to a rear plate. The spline supporting member is provided with a spline positioning mechanism for adjusting the mounting position of the spline supporting member. The nut supporting member is provided with a nut positioning mechanism for adjusting the mounting position of the nut supporting member. The spline supporting member and the nut supporting member are formed with holes for axial-center checking, rods being inserted through the holes.

8 Claims, 4 Drawing Sheets

(56) References Cited

U.S. PATENT DOCUMENTS

| | | | | |
|---|---|---|---|---|
| 5,645,868 | A * | 7/1997 | Reinhart | B29C 45/5008 425/145 |
| 5,914,139 | A * | 6/1999 | Matsubayashi | B29C 45/5008 264/40.3 |
| 6,059,556 | A * | 5/2000 | Koike | B29C 45/5008 425/145 |
| 6,354,829 | B1 * | 3/2002 | Koide | B29C 45/1761 425/557 |
| 6,386,853 | B1 * | 5/2002 | Mizuno | B29C 45/5008 425/145 |
| 6,409,957 | B1 * | 6/2002 | Hiraga | B29C 45/5008 264/328.1 |
| 6,726,862 | B2 * | 4/2004 | Teraoka | B29C 44/3446 264/40.5 |
| 2001/0016216 | A1 * | 8/2001 | Emoto | B29C 45/5008 425/145 |
| 2001/0041197 | A1 * | 11/2001 | Yoshioka | B29C 45/5008 425/149 |
| 2002/0081351 | A1 * | 6/2002 | Yokoya | B29C 45/17 425/589 |
| 2003/0090019 | A1 * | 5/2003 | Amano | B29C 45/82 264/40.5 |
| 2004/0109917 | A1 * | 6/2004 | Schad | B29C 45/5008 425/574 |
| 2004/0228944 | A1 * | 11/2004 | Kasai | B29C 45/5008 425/587 |
| 2004/0265423 | A1 * | 12/2004 | Yoshioka | B29C 45/5008 425/574 |
| 2006/0017416 | A1 * | 1/2006 | Konno | B29C 45/7666 318/645 |
| 2006/0188597 | A1 * | 8/2006 | Chang | B29C 45/5008 425/149 |
| 2007/0020354 | A1 * | 1/2007 | Dantlgraber | B29C 45/5008 425/574 |
| 2016/0075065 | A1 | 3/2016 | Yokoyama | |
| 2016/0096301 | A1 | 4/2016 | Yano et al. | |

FOREIGN PATENT DOCUMENTS

| | | |
|---|---|---|
| JP | S6119325 A | 1/1986 |
| JP | 04067928 A | 3/1992 |
| JP | H055427 U | 1/1993 |
| JP | 06143372 A | 5/1994 |
| JP | 08039633 A | 2/1996 |
| JP | 2005313564 A | 11/2005 |
| JP | 2007216453 A | 8/2007 |

* cited by examiner

INJECTION DEVICE AND AXIAL-CENTER POSITION ADJUSTING METHOD

CROSS-REFERENCE TO RELATED APPLICATION

This application is based upon and claims the benefit of priority from Japanese Patent Application No. 2016-226993 filed on Nov. 22, 2016, the contents of which are incorporated herein by reference.

BACKGROUND OF THE INVENTION

Field of the Invention

The present invention relates to an injection device and an axial-center position adjusting method for adjusting the axial-center positions of a spline shaft and a spline nut fitted onto the spline shaft for rotating a screw.

Description of the Related Art

Japanese Laid-Open Patent Publication No. 61-019325 discloses a screw rotation/injection mechanism in an injection molding machine. Briefly describing, this disclosure provides a configuration in which, by use of a ball screw and a ball nut, a screw is moved forward and backward by moving a pressure plate that rotatably supports the screw, and rotated by means of a spline shaft and a spline fitting nut fitted on the spline shaft. This configuration makes it possible to enhance the response of forward and backward movement of the screw.

Japanese Laid-Open Patent Publication No. 08-039633 discloses an injection device for an electric injection molding machine. Briefly describing, this discloses a configuration in which a single motor is used to perform metering and injection, and rotate a screw using a spline mechanism.

SUMMARY OF THE INVENTION

The above-mentioned Japanese Laid-Open Patent Publication No. 61-019325 and Japanese Laid-Open Patent Publication No. 08-039633 provide configurations for rotating a screw using a spline shaft and a fitting member such as a nut fitted on the spline shaft. However, these configurations do not include any means for checking whether or not the axial center of the spline shaft and the axial center of the fitting member coincide with each other. If the axial centers of the spline shaft and the fitting member do not coincide with each other, problems occur that the injection operation becomes heavy due to an unbalanced load and that the tooth flank of the spline shaft becomes heavily worn down.

It is therefore an object of the present invention to provide an injection device and an axial-center position adjusting method, which are capable of checking on positional deviation between the axial center of a spline shaft and the axial center of a spline nut to be fitted on the spline shaft, and which, when positional deviation of the axial-center position has occurred, make it possible to adjust the axial centers of the spline shaft and the spline nut so as to coincide with each other.

According to a first aspect of the present invention, an injection device includes: a screw inserted into a cylinder and configured to move in an axial direction and rotate about the axial direction; a pressure plate configured to support the screw rotatably but immovably in the axial direction; an injection motor configured to move the pressure plate in the axial direction; a fixed plate configured to support the injection motor and receive a reaction force of the pressure plate; a first supporting member, configured to support a spline shaft or a spline nut fitted on the spline shaft rotatably but immovably in the axial direction, and attached to the pressure plate; a second supporting member configured to support the spline nut or the spline shaft rotatably but immovably in the axial direction, and attached to the fixed plate; a rotary motor attached to the fixed plate and configured to rotate the screw via the spline shaft and the spline nut; a first torque transmitting mechanism configured to transmit a torque of the rotary motor to the spline nut or the spline shaft supported by the second supporting member attached to the fixed plate; and a second torque transmitting mechanism configured to transmit a torque that is generated on the spline shaft or the spline nut supported by the first supporting member attached to the pressure plate, to the screw. In this arrangement, the first supporting member is provided with a first positioning mechanism configured to adjust a mounting position of the first supporting member with respect to the pressure plate, the second supporting member is provided with a second positioning mechanism configured to adjust a mounting position of the second supporting member with respect to the fixed plate, and the first supporting member and the second supporting member include holes formed therein for axial-center checking, rods being inserted through the holes.

A second aspect of the present invention is an axial-center position adjusting method of adjusting axial-center positions of a spline shaft and a spline nut of an injection device, the injection device including the spline shaft configured to rotate a screw inserted into a cylinder, and the spline nut fitted on the spline shaft. The injection device further includes: a first supporting member attached to a pressure plate that supports the screw rotatably but immovably in an axial direction, and configured to support the spline shaft or the spline nut rotatably but immovably in the axial direction; a second supporting member attached to a fixed plate that supports an injection motor and receives a reaction force of the pressure plate, the injection motor being configured to move the pressure plate in the axial direction, and configured to support the spline nut or the spline shaft rotatably but immovably in the axial direction; a rotary motor attached to the fixed plate and configured to rotate the screw via the spline shaft and the spline nut; a first torque transmitting mechanism configured to transmit a torque of the rotary motor to the spline nut or the spline shaft supported by the second supporting member attached to the fixed plate; and a second torque transmitting mechanism configured to transmit a torque that is generated on the spline shaft or the spline nut supported by the first supporting member attached to the pressure plate, to the screw, and the first supporting member is provided with a first positioning mechanism configured to adjust a mounting position of the first supporting member with respect to the pressure plate, the second supporting member is provided with a second positioning mechanism configured to adjust a mounting position of the second supporting member with respect to the fixed plate; and the first supporting member and the second supporting member include holes formed therein for axial-center checking, rods being through the holes. In this arrangement, the method includes the step of, in mounting the first supporting member and the second supporting member, adjusting the mounting positions of the first supporting member and the second supporting member by use of the first positioning mechanism and the second positioning mechanism in a manner that the rods are inserted through the holes formed in the first supporting member and the second supporting member.

According to the present invention, it is possible to easily check the positional deviation between the axial centers of the spline shaft and the spline nut. Further, even when the positional deviation of the axial centers occurs, it is possible to easily adjust the position of the axial center of the spline shaft and the position of the axial center of the spline nut such that the positions of the axial centers coincide with each other.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

An injection device and an axial-center position adjusting method according to the present invention will be hereinbelow described in detail by giving preferred embodiments with reference to the accompanying drawings.

Figure 1:
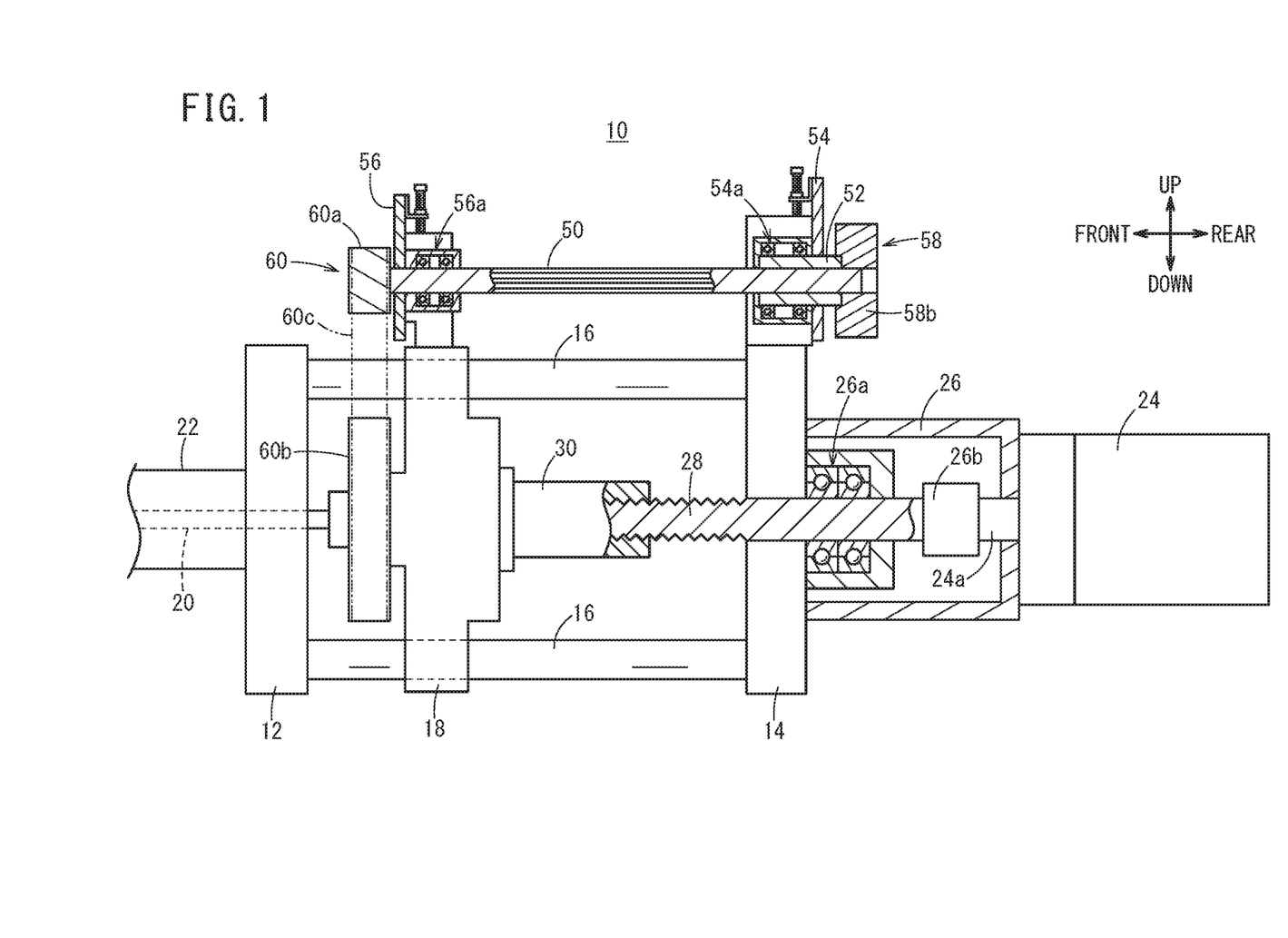
FIG. 1 is a partially sectional front view of an injection device of an injection molding machine according to an embodiment of the present invention.
Figure 2:
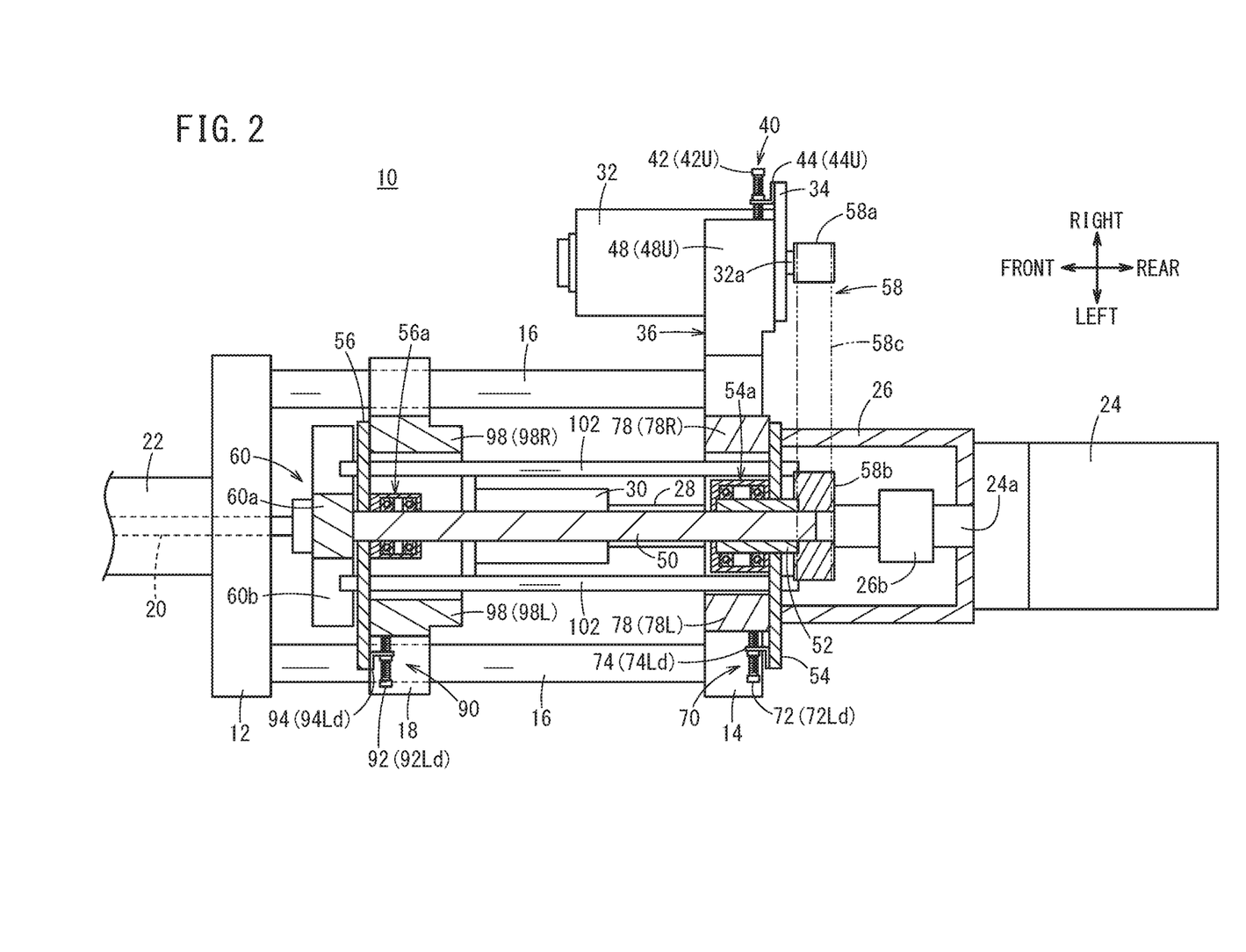
FIG. 2 is a partially sectional plan view of the injection device shown in FIG. 1.

FIG. 1 is a partially sectional front view of an injection device 10 of an injection molding machine, and FIG. 2 is a partially sectional plan view of the injection device 10. It should be noted that the directions of front and rear, left and right, and up and down, will be described in accordance with the directions of the arrows shown in FIGS. 1 and 2.

The injection device 10 includes a front plate 12 provided at the front, a rear plate (fixed plate) 14 provided at the rear, and multiple tie bars 16 joining the front plate 12 and the rear plate 14. A pressure plate 18 is provided between the front plate 12 and the rear plate 14. The pressure plate 18 is movable in the front-rear direction along the axial direction of the multiple tie bars 16. The pressure plate 18 supports a screw 20 rotatably but immovably in the axial direction. The screw 20 is inserted in a cylinder (barrel) 22 such as a heating cylinder, and can move in the axial direction and rotate around an axis thereof. A mold clamping device (not shown) having a mold of the injection molding machine is arranged in front of the cylinder 22.

An injection motor 24 for moving the pressure plate 18 in the axial direction of the screw 20 (the axial direction of the tie bar 16) is attached to a rear portion of the rear plate 14 by means of an injection motor supporting member 26. The pressure plate 18 is provided with a nut 30 that is screw-engaged with a ball screw 28 extending in the axial direction of the screw 20. The injection motor 24 rotates the ball screw 28 to thereby move the pressure plate 18 in the axial direction. A bearing 26a for rotatably supporting the ball screw 28 and a coupling member 26b for coupling the ball screw 28 with a rotary shaft 24a of the injection motor 24 are arranged in the casing of the injection motor supporting member 26.

With this arrangement, as the rotary shaft 24a of the injection motor 24 rotates, the ball screw 28 also rotates, so that the pressure plate 18 provided with the nut 30 moves in the axial direction of the ball screw 28 (axial direction of the screw 20). Therefore, the screw 20 provided on the pressure plate 18 also moves in the axial direction.

Figure 3:
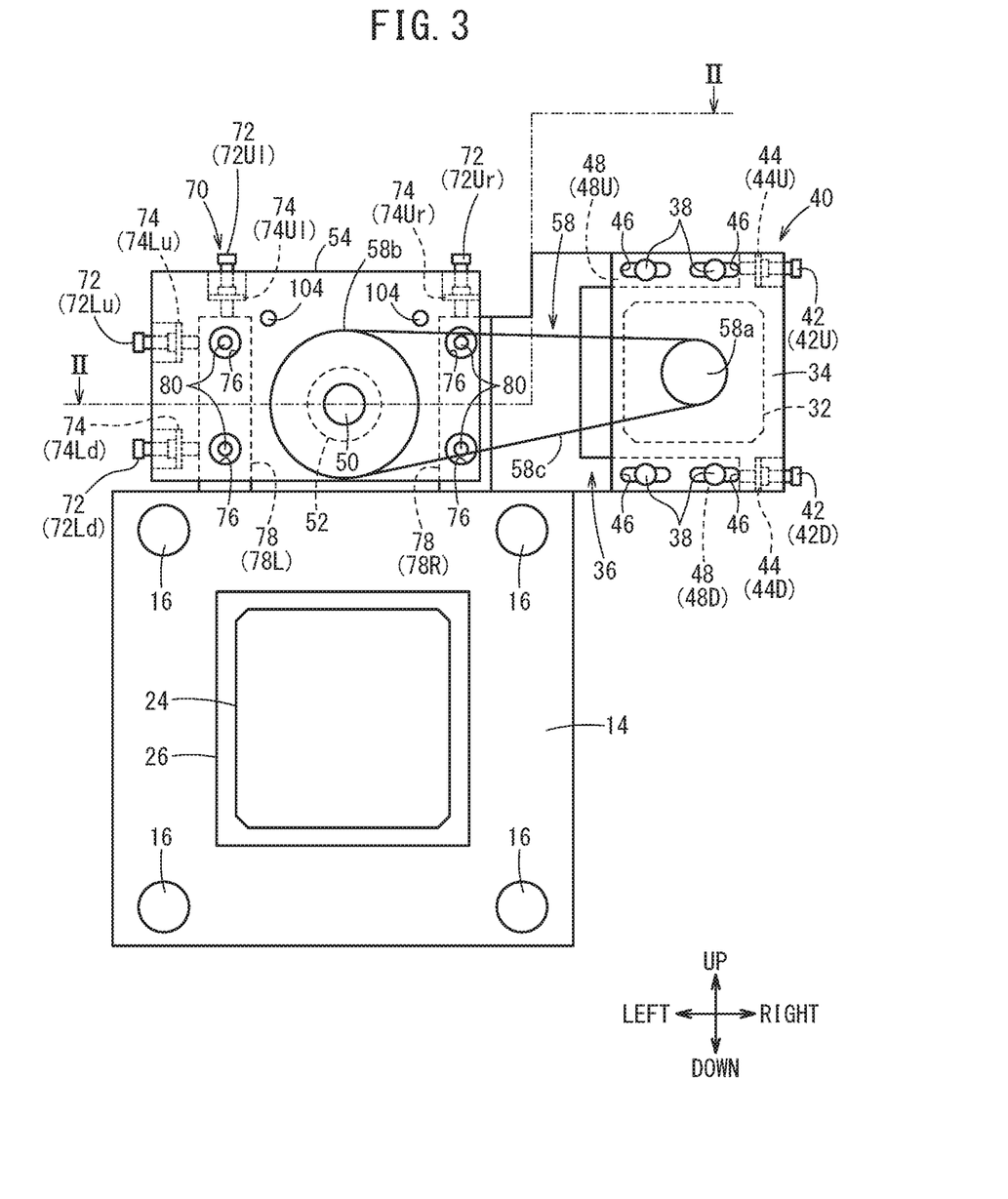
FIG. 3 is a rear view of a rear plate shown in FIGS. 1 and 2.

A rotary motor 32 for rotating the screw 20 is attached to an upper portion of the rear plate 14 via a positioning plate 34 and a rotary motor supporting member 36 (see FIG. 3). As shown in FIG. 3, the rotary motor 32 is attached to the center of the positioning plate 34, and the rotary motor supporting member 36 is attached to the upper portion of the rear plate 14. The positioning plate 34 and the rotary motor supporting member 36 are fastened by fastening screw members 38 such as screws. Here, FIG. 3 is a view of the rear plate 14 viewed from the rear, and FIG. 2 is a partially sectional plan view of the injection device 10 as seen from the direction of the arrows II-II in FIG. 3.

As shown in FIG. 3, the positioning plate 34 has a positioning mechanism 40 for adjusting the mounting position of the positioning plate 34 (rotary motor 32) relative to the rear plate 14. The positioning mechanism 40 includes two adjusting screw members 42 in the form of screws, bolts or the like, two screw supporting members 44 having a substantially L-shape, and which support the respective adjusting screw members 42 by being screw-engaged with the adjusting screw members 42, and four slots 46 formed in the positioning plate 34 so as to extend in the left and right direction.

The two screw supporting members 44 for supporting the adjusting screw members 42 are provided on the upper right side and the lower right side of the positioning plate 34 such that the adjusting screw members 42 can move leftward and rightward. The rotary motor 32 is located between the upper and lower screw supporting members 44.

In order to distinguish the two screw supporting members 44 from each other, the screw supporting member 44 arranged at the upper right side may be denoted by 44U, and the screw supporting member 44 arranged at the lower right side may be denoted by 44D in some cases. In addition, the adjusting screw member 42 supported by the screw supporting member 44U may be represented by 42U, and the adjusting screw member 42 supported by the screw supporting member 44D may be represented by 42D in some cases.

The rotary motor supporting member 36 is formed with two abutment members 48 that protrude rightward in such a manner as to interpose the rotary motor 32 therebetween in the vertical direction and abut against distal ends of the adjusting screw members 42. Hereinbelow, in order to distinguish the two abutment members 48 from each other, the abutment member 48 formed on the upper side may be represented by 48U, and the abutment member 48 formed on the lower side may be represented by 48D.

The distal end (right side surface) of the abutment member 48U formed on the upper side abuts against the distal end of the adjusting screw member 42U arranged on the upper side, and the distal end (right side surface) of the abutment member 48D formed on the lower side abuts against the distal end of the adjusting screw member 42D arranged on the lower side. The two abutment members 48 each are formed with two screw holes (not shown) into which fastening screw members 38 are screw-engaged. The aforementioned four slots 46 are formed corresponding to these four screw holes.

As the adjusting screw member 42 is turned, the amount of projection (protruding length) of the adjusting screw member 42 from the screw supporting member 44 varies accordingly. In attaching the positioning plate 34 (rotary motor 32), the four fastening screw members 38 are inserted through the respective four slots 46 of the positioning plate 34, and temporarily tightened to the aforementioned four screw holes formed in the two abutment members 48. This temporary tightening puts the positioning plate 34 in a state in which the positioning plate 34 is attached to the rotary motor supporting member 36 so as to be slidable relative to the rotary motor supporting member 36, i.e., in a so-called temporarily attached state.

When, with the fastening screw members temporarily tightened (in the temporarily attached state), the two adjusting screw members 42 are turned (clockwise rotation) so that the amount of projection of the adjusting screw members 42 from their screw supporting members 44 becomes longer (i.e., when the adjusting screw members 42 are moved leftward relative to the screw supporting members 44), the positioning plate 34 accordingly moves rightward relative to the rotary motor supporting member 36. Conversely, when the two adjusting screw members 42 are rotated in reverse (counterclockwise rotation) to shorten the projecting amount of the adjusting screw members 42 from the screw supporting members 44 (i.e., when the adjusting screw members 42 are moved rightward relative to the screw supporting members 44), the positioning plate 34 can be moved leftward relative to the rotary motor supporting member 36. In this way, by turning the adjusting screw members 42, it is possible to adjust the position of the positioning plate 34 relative to the rotary motor supporting member 36 in the left-right direction.

At this time, by causing the length of projection of the adjusting screw member 42U from the screw supporting member 44U to be different from the length of projection of the adjusting screw member 42D from the screw supporting member 44D, the positioning plate 34 can be slightly inclined with respect to the left-right direction.

Then, by firmly tightening the four fastening screw members 38 after the position adjustment, the positioning plate 34 and the rotary motor supporting member 36 can be fastened to each other. By turning the adjusting screw members 42 in this manner, the mounting position of the rotary motor 32 relative to the rear plate 14 can be adjusted. The positioning plate 34 is movable within a range in which each fastening screw member 38 can relatively move within the slot 46.

The injection device 10 includes a spline shaft 50 extending in the axial direction of the screw 20, and a spline nut 52 fitted on the spline shaft 50 in order to transmit a torque of the rotary motor 32 to the screw 20. Since the spline shaft 50 and the spline nut 52 are spline-fitted, the spline shaft 50 and the spline nut 52 rotate together. Further, the relative position between the spline shaft 50 and the spline nut 52 can be displaced with respect to the axial direction.

A flat-plate-shaped nut supporting member (second supporting member) 54 that supports the spline nut 52 rotatably but immovably in the axial direction is attached to the rear plate 14. The nut supporting member 54 is provided with a bearing 54a, which supports the spline nut 52 rotatably, but immovably in the axial direction.

A flat-plate-shaped spline supporting member (first supporting member) 56 which supports the spline shaft 50 rotatably but immovably in the axial direction is attached to the pressure plate 18. The spline supporting member 56 is provided with a bearing 56a, which supports the spline shaft 50 rotatably, but immovably in the axial direction.

The injection device 10 includes a first torque transmitting mechanism 58 for transmitting a torque of the rotary motor 32 to the spline nut 52, and a second torque transmitting mechanism 60 for transmitting a torque generated on the spline shaft 50 to the screw 20.

As also shown in FIG. 3, the first torque transmitting mechanism 58 includes a pulley 58a attached to the rotary shaft 32a of the rotary motor 32 and which rotates together with the rotary shaft 32a, a pulley 58b attached to the spline nut 52 and which rotates together with the spline nut 52, and a belt 58c transmitting the torque of the pulley 58a to the pulley 58b.

Figure 4:
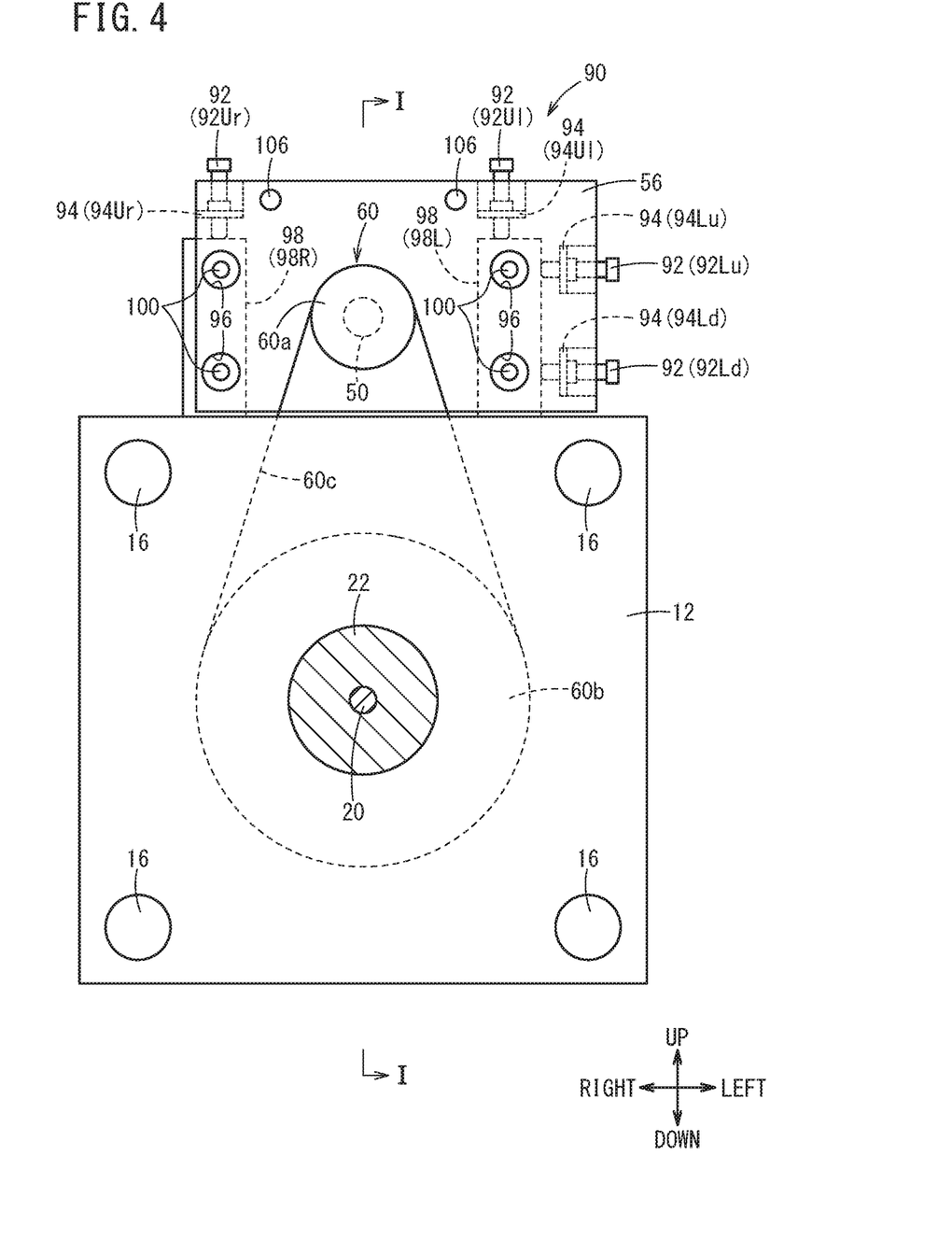
FIG. 4 is a front view of a front plate shown in FIGS. 1 and 2.

As shown in FIG. 4, the second torque transmitting mechanism 60 includes a pulley 60a provided on the spline shaft 50 and which rotates together with the spline shaft 50, a pulley 60b provided on the pressure plate 18 and which rotates together with the screw 20, and a belt 60c transmitting the torque of the pulley 60a to the pulley 60b. Here, FIG. 4 is a view of the front plate 12 viewed from the front, and FIG. 1 is a partially sectional front view of the injection device 10 as seen from the direction of the arrows I-I in FIG. 4.

The annular belt 58c is wound over the pulleys 58a and 58b under the application of a predetermined tension. The annular belt 60c is wound over the pulleys 60a and 60b under the application of a predetermined tension.

With the above configuration, the screw 20 is moved in the axial direction by the injection motor 24 etc., and rotated about its axis by the rotary motor 32 etc.

Next, a mechanism for checking whether or not the axial centers of the spline shaft 50 and the spline nut 52 coincide with each other, and a mechanism for adjusting positions such that the axial centers of the spline shaft 50 and the spline nut 52 coincide with each other will be described by mainly referring to FIGS. 3 and 4.

As shown in FIG. 3, the nut supporting member 54 is provided with a nut positioning mechanism (second positioning mechanism) 70 for adjusting the mounting position of the nut supporting member 54 (the spline nut 52) with respect to the rear plate 14. The nut positioning mechanism 70 includes four adjusting screw members 72 formed of screws, bolts or the like, four screw supporting members 74 each having a substantially L-shape, and which support the respective adjusting screw members 72 by being screw-engaged with the adjusting screw members 72, and four adjustment holes 76 formed in the nut supporting member 54.

Of the four screw supporting members 74, the two screw supporting members 74 support the adjusting screw members 72 so as to be movable vertically, and are arranged respectively at left and right positions of the upper side of the nut supporting member 54. The other two screw supporting members 74 support the adjusting screw members 72 so as to be movable in the left and right directions, and are arranged respectively at upper and lower positions on the left side of the nut supporting member 54.

In order to distinguish the four screw supporting members 74 from each other, the screw supporting members 74 arranged at the left and right positions of the upper side to support the adjusting screw members 72 so as to be movable vertically may be denoted by 74Ul and 74Ur, respectively. Further, the screw supporting members 74 arranged at the upper and lower positions on the left side to support the adjusting screw members 72 so as to be movable in the left and right directions may be denoted by 74Lu and 74Ld, respectively. Additionally, in some cases, the adjusting screw members 72 supported by the screw supporting members 74Ul and 74Ur may be represented respectively by 72Ul and 72Ur, whereas the adjusting screw members 72 supported by the screw supporting members 74Lu, 74Ld may be represented respectively by 72Lu, 72Ld.

The rear plate 14 are formed with two abutment members 78 that protrude from the top of the rear plate 14 in such a manner as to interpose the spline nut 52 and the bearing 54a therebetween in the left and right direction, and abut against the distal ends of the adjusting screw members 72. Hereinbelow, in order to distinguish the two abutment members 78 from each other, the abutment member 78 formed on the left side may be represented by 78L and the abutment member 78 formed on the right side may be represented by 78R in some cases. Here, the rotary motor supporting member 36 is attached to the upper portion of the rear plate 14 on the right side of the abutment member 78R.

The distal ends (upper surfaces) of the two abutment members 78 abut against the distal ends of the two adjusting screw members 72Ul and 72Ur. Further, the left side (left side face) of the left abutment member 78L abuts against the distal ends of the two adjusting screw members 72Lu and 72Ld. The two abutment members 78 each are formed with two screw holes 80 into which unillustrated fastening screw members formed of screws or the like are screw-engaged. The four adjustment holes 76 are formed corresponding to these four screw holes 80. The adjustment hole 76 has a diameter greater than that of the screw hole 80.

As the adjusting screw member 72 is turned, the amount of projection (protruding length) of the adjusting screw member 72 from the screw supporting member 74 varies accordingly. In attaching the nut supporting member 54 (the spline nut 52), the aforementioned four fastening screw members are inserted through the respective four adjustment holes 76 and temporarily tightened to the four screw holes 80. This temporary tightening puts the nut supporting member 54 in a state in which the nut supporting member is attached to the rear plate 14 (abutment members 78) so as to be slidable in the left-right and vertical directions relative to the rear plate 14 (abutment members 78), i.e., in a so-called temporarily attached state.

When, with the fastening screw members temporarily tightened (in the temporarily attached state), the two adjusting screw members 72Ul and 72Ur are turned (clockwise rotation) so that the amount of projection of the adjusting screw members 72Ul and 72Ur from the respective screw supporting members 74Ul and 74Ur becomes longer, i.e., when the adjusting screw members 72Ul and 72Ur are moved downward relative to the respective screw supporting members 74Ul and 74Ur, the nut supporting member 54 moves upward relative to the rear plate 14 (abutment members 78). Conversely, when the two adjusting screw members 72Ul, 72Ur are turned in reverse (counterclockwise rotation) to shorten the projecting amount of the adjusting screw members 72Ul, 72Ur from the screw supporting members 74Ul, 74Ur, that is, when the adjusting screw members 72Ul and 72Ur are moved upward relative to the respective screw supporting members 74Ul and 74Ur, the nut supporting member 54 moves downward relative to the rear plate 14.

At this time, by causing the length of projection of the adjusting screw member 72Ul from the screw supporting member 74Ul to be different from the length of projection of the adjusting screw member 72Ur from the screw supporting member 74Ur, the nut supporting member 54 can be slightly inclined with respect to the vertical direction.

When, with the fastening screw members temporarily tightened (in the temporarily attached state), the two adjusting screw members 72Lu and 72Ld are turned (clockwise rotation) so that the amount of projection of the adjusting screw members 72Lu and 72Ld from the respective screw supporting members 74Lu and 74Ld becomes longer, i.e., when the adjusting screw members 72Lu and 72Ld are moved rightward relative to the respective screw supporting members 74Lu and 74Ld, the nut supporting member 54 moves leftward relative to the rear plate 14 (abutment member 78). Conversely, when the two adjusting screw members 72Lu, 72Ld are turned in reverse (counterclockwise rotation) to thereby shorten the projecting amount of the adjusting screw members 72Lu, 72Ld from the screw supporting members 74Lu, 74Ld, that is, when the adjusting screw members 72Lu and 72Ld are moved leftward relative to the respective screw supporting members 74Lu and 74Ld, the nut supporting member 54 moves rightward relative to the rear plate 14.

At this time, by tightening the screw members such that the length of projection of the adjusting screw member 72Lu from the screw supporting member 74Lu is different from the length of projection of the adjusting screw member 72Ld from the screw supporting member 74Ld, the nut supporting member 54 can be slightly inclined with respect to the left-right direction.

Then, by firmly tightening the aforementioned four fastening screw members after the position adjustment, the nut supporting member 54 and the rear plate 14 can be fastened to each other. By turning the adjusting screw members 72 in this manner, the mounting position of the nut supporting member 54 relative to the rear plate 14 can be adjusted with respect to the vertical and horizontal directions. It should be noted that the nut supporting member 54 is movable within a range in which each fastening screw member described above can move within the adjustment hole 76.

As shown in FIG. 4, the spline supporting member 56 has a spline positioning mechanism (first positioning mechanism) 90 for adjusting the mounting position of the spline supporting member 56 (spline shaft 50) relative to the pressure plate 18. The spline positioning mechanism 90 includes four adjusting screw members 92 formed of screws, bolts or the like, four screw supporting members 94 each having a substantially L-shape, and which support the adjusting screw members 92 by being screw-engaged with the screw members 92, and four adjustment holes 96 formed in the spline supporting member 56.

Of the four screw supporting members 94, the two screw supporting members 94 that support the adjusting screw members 92 so as to be movable vertically are arranged respectively at left and right positions of an upper side of the spline supporting member 56. The other two screw supporting members 94 support the adjusting screw members 92 so as to be movable in the left and right directions, and are arranged respectively at upper and lower positions on the left side of the spline supporting member 56.

In order to distinguish the four screw supporting members 94 from each other, the screw supporting members 94 arranged at the left and right positions on the upper side to support the adjusting screw members 92 so as to be movable in the veridical direction may be denoted by 94Ul and 94Ur, respectively. In addition, the screw supporting members 94 arranged at the upper and lower positions on the left side to support the adjusting screw members 92 so as to be movable in the left and right directions may be denoted by 94Lu and 94Ld, respectively. Further, the adjusting screw members 92 supported by the screw supporting members 94Ul and 94Ur may be denoted respectively by 92Ul and 92Ur, while the adjusting screw members 92 supported by the screw supporting members 94Lu and 94Ld may be denoted by 92Lu and 92Ld, respectively.

The pressure plate 18 is formed with two abutment members 98 that protrude from the upper portion of the pressure plate 18 so as to interpose the spline shaft 50 and the bearing 56a therebetween in the left and right direction, and abut against the distal ends of the adjusting screw members 92. Hereinafter, in order to distinguish the two abutment members 98 from each other, the abutment member 98 formed on the left side may be denoted by 98L and the abutment member 98 formed on the right side may be denoted by 98R in some cases.

The distal ends (top faces) of the two abutment members 98 abut against the distal ends of the two adjusting screw members 92Ul and 92Ur. Further, the left side (left side face) of the left abutment member 98L abuts against the distal ends of the two adjusting screw members 92Lu and 92Ld. The two abutment members 98 each are formed with two screw holes 100 into which fastening screw members (not shown) formed of screws or the like are screw-engaged. The four adjustment holes 96 are formed corresponding to these four screw holes 100. The adjustment hole 96 has a diameter greater than that of the screw hole 100.

As the adjusting screw member 92 is turned, the amount of projection (protruding length) of the adjusting screw member 92 from the screw supporting member 94 varies accordingly. In attaching the spline supporting member 56 (spline shaft 50), the aforementioned four fastening screw members are inserted through the four adjustment holes 96 and temporarily tightened to the four screw holes 100. This temporary tightening puts the spline supporting member 56 in a state in which the spline supporting member is attached to the pressure plate 18 (abutment members 98) so as to be slidable in the left-right and vertical directions relative to the pressure plate 18 (abutment members 98), i.e., in a so-called temporarily attached state.

When, with the fastening screw members temporarily tightened (in the temporarily attached state), the two adjusting screw members 92Ul, 92Ur are turned (clockwise rotation) so that the amount of projection of the adjusting screw members 92Ul and 92Ur from the respective screw supporting members 94Ul and 94Ur becomes longer, i.e., when the adjusting screw members 92Ul, 92Ur are moved downward relative to the screw supporting members 94Ul, 94Ur, the spline supporting member 56 moves upward relative to the pressure plate 18 (abutment members 98). Conversely, when the two adjusting screw members 92Lu, 92Ld are rotated in reverse (counterclockwise rotation) to thereby shorten the projecting amount of the adjusting screw members 92Ul, 92Ur from the screw supporting members 94Ul, 94Ur, that is, when the adjusting screw members 92Ul, 92Ur are moved upward relative to the screw supporting members 94Ul, 94Ur, the spline supporting member 56 moves downward relative to the pressure plate 18.

At this time, by tightening the screw members such that the length of projection of the adjusting screw member 92Ul from the screw supporting member 94Ul is different from the length of projection of the adjusting screw member 92Ur from the screw supporting member 94Ur, the spline supporting member 56 can be slightly inclined with respect to the vertical direction.

When, with the screw members temporarily tightened (in the temporarily attached state), the two adjusting screw members 92Lu, 92Ld are turned (clockwise rotation) so that the amount of projection of the adjusting screw members 92Lu and 92Ld from the respective screw supporting members 94Lu and 94Ld becomes longer, i.e., when the adjusting screw members 92Lu and 92Ld are moved rightward relative to respective screw supporting members 94Lu and 94Ld, the spline supporting member 56 moves leftward relative to the pressure plate 18 (abutment member 98). Conversely, when the two adjusting screw members 92Lu, 92Ld are turned in reverse (counterclockwise rotation) to thereby shorten the projecting amount of the adjusting screw members 92Lu, 92Ld from the screw supporting members 94Lu, 94Ld, that is, when the adjusting screw members 92Lu and 92Ld are moved leftward relative to respective screw supporting members 94Lu and 94Ld, the spline supporting member 56 can be moved rightward relative to the pressure plate 18.

At this time, by tightening the screw members such that the length of projection of the adjusting screw member 92Lu from the screw supporting member 94Lu is different from the length of projection of the adjusting screw member 92Ld from the screw supporting member 94Ld, the nut supporting member 54 can be slightly inclined with respect to the left-right direction.

Then, by firmly tightening the aforementioned four fastening screw members after the position adjustment, the spline supporting member 56 and the pressure plate 18 can be fastened to each other. By turning the adjusting screw members 92 in this way, it is possible to adjust the mounting position of the spline supporting member 56 relative to the pressure plate 18 in the vertical and horizontal directions. It should be noted that the spline supporting member 56 is movable within a range in which each of the above-mentioned fastening screw members can relatively move within the adjustment hole 96.

The nut supporting member 54 and the spline supporting member 56 are formed respectively with holes 104 and 106 for axial-center checking (for axial-center adjustment), into which the rods 102 (see FIG. 2) are inserted. These holes 104 and 106 are formed in the nut supporting member 54 and the spline supporting member 56 such that the rods 102 inserted through the holes 104 and 106 become parallel to the spline shaft 50 when the axial centers of the spline nut 52 and the spline shaft 50 coincide with each other. In the present embodiment, two holes 104 are formed in the nut supporting member 54 while two holes 106 are formed in the spline supporting member 56 at positions corresponding to respective two holes 104.

With this arrangement, it is possible to check whether or not the axial center of the spline nut 52 and the axial center of the spline shaft 50 coincide with each other by checking whether the rods 102 inserted from the holes 104 or the holes 106 can smoothly pass through the opposite holes 106 or 104 in a state where the nut supporting member 54 and spline supporting member 56 are temporarily attached.

When the rods 102 do not pass through the opposite holes 106, 104, that is, when the axial centers do not coincide with each other, at least one of the nut positioning mechanism 70 and the spline positioning mechanism 90 is operated to adjust at least one of the mounting position of the nut supporting member 54 relative to the rear plate 14 and the mounting position of the spline supporting member 56 relative to the pressure plate 18 so that the rods 102 can smoothly pass through both the holes 104 and 106. Thus, it is possible to make the axial-center position of the spline shaft 50 and the axial-center position of the spline nut 52 coincide with each other.

Although the nut supporting member (second supporting member) 54 attached to the rear plate 14 is configured to support the spline nut 52 rotatably, the spline shaft 50 may be rotatably supported. Further, although the spline supporting member (first supporting member) 56 attached to the pressure plate 18 is configured to rotatably support the spline shaft 50, the spline nut 52 may be rotatably supported.

The nut positioning mechanism 70 is configured to move the nut supporting member 54 in the left-right and vertical directions relative to the rear plate 14. However, the nut positioning mechanism 70 may be given in any form as long as the nut supporting member 54 can be moved relative to the rear plate 14 along a plane orthogonal to the axial direction of the screw 20 (the axial direction of the spline shaft 50). Further, though the spline positioning mechanism 90 is configured to move the spline supporting member 56 in the left-right and vertical directions relative to the pressure plate 18, the spline positioning mechanism 90 may be given in any form as long as the spline supporting member 56 can be moved relative to the pressure plate 18 along a plane orthogonal to the axial direction of the screw 20 (the axial direction of the spline shaft 50).

As has been described heretofore, the injection device 10 described in the embodiment includes a screw 20 inserted into a cylinder 22 and capable of moving in an axial direction and rotating about the axial direction, a pressure plate 18 supporting the screw 20 rotatably but immovably in the axial direction, an injection motor 24 moving the pressure plate 18 in the axial direction, and a rear plate 14 supporting the injection motor 24 and receiving a reaction force of the pressure plate 18. The injection device 10 further includes a first supporting member 56 attached to the pressure plate 18 and configured to support a spline shaft 50 or a spline nut 52 fitted on the spline shaft 50 rotatably but immovably in the axial direction, a second supporting member 54 attached to the rear plate 14 and configured to support the spline nut 52 or the spline shaft 50 rotatably but immovably in the axial direction, a rotary motor 32 attached to the rear plate 14 and configured to rotate the screw 20 via the spline shaft 50 and the spline nut 52, a first torque transmitting mechanism 58 configured to transmit a torque of the rotary motor 32 to the spline nut 52 or the spline shaft 50 supported by the second supporting member 54 attached to the rear plate 14, and a second torque transmitting mechanism 60 configured to transmit a torque that is generated on the spline shaft 50 or the spline nut 52 supported by the first supporting member 56 attached to the pressure plate 18, to the screw 20. The first supporting member 56 is provided with a first positioning mechanism 90 for adjusting the mounting position of the first supporting member 56 with respect to the pressure plate 18, and the second supporting member 54 is provided with a second positioning mechanism 70 for adjusting the mounting position of the second supporting member 54 with respect to the rear plate 14. The first supporting member 56 and the second supporting member 54 include holes 106, 104 formed therein for axial-center checking, rods 102 being inserted through the holes 106, 104.

This makes it possible to easily check the positional deviation between the axial centers of the spline shaft 50 and the spline nut 52. Further, even when the positional deviation of the axial centers occurs, it is possible to easily adjust the position of the axial center of the spline shaft 50 and the position of the axial center of the spline nut 52 such that the positions of the axial centers coincide with each other.

The first positioning mechanism 90 adjusts the mounting position of the first supporting member 56 with respect to the pressure plate 18 along a plane orthogonal to the axial direction of the screw 20 (the axial direction of the spline shaft 50). The second positioning mechanism 70 adjusts the mounting position of the second supporting member 54 with respect to the rear plate 14 along a plane orthogonal to the axial direction of the screw 20 (the axial direction of the spline shaft 50).

In this manner, since the first supporting member 56 and the second supporting member 54 that support the spline shaft 50 and the spline nut 52 can be slid along planes orthogonal to the axial direction, the position of the axial center of the spline shaft 50 and the position of the axial center of the spline nut 52 can be accurately adjusted.

The first positioning mechanism 90 and the second positioning mechanism 70 each include adjusting screw members 92, 72 and screw supporting members 94, 74 supporting the adjusting screw members 92, 72 by being screw-engaged with the adjusting screw members 92, 72. The pressure plate 18 and the rear plate 14 are each provided with abutment members 98, 78 that abut against the distal ends of the adjusting screw members 92, 72. By changing the amounts of projection of the adjusting screw members 92, 72 from the respective screw supporting members 94, 74 as a result of rotation of the adjusting screw members 92, 72, the mounting positions of the first supporting member 56 and the second supporting member 54 are adjusted.

Owing thereto, the position of the axial center of the spline shaft 50 and the position of the axial center of the spline nut 52 can be easily adjusted.

In mounting the first supporting member 56 and the second supporting member 54, the mounting positions of the first supporting member 56 and the second supporting member 54 are adjusted by the first positioning mechanism 90 and the second positioning mechanism 70 such that the rods 102 are inserted through the holes 106, 104 formed in the first supporting member 56 and the second supporting member 54.

With this configuration, the position of the axial center of the spline shaft 50 and the position of the axial center of the spline nut 52 can be easily adjusted so that the axial-center positions coincide with each other.

While the invention has been particularly shown and described with reference to preferred embodiments, it will be understood that variations and modifications can be effected thereto by those skilled in the art without departing from the scope of the invention as defined by the appended claims.

What is claimed is:

1. An injection device comprising:
    a screw inserted into a cylinder and configured to move in an axial direction and rotate about the axial direction;
    a pressure plate configured to support the screw rotatably but immovably in the axial direction;
    an injection motor configured to move the pressure plate in the axial direction;
    a fixed plate configured to support the injection motor and receive a reaction force of the pressure plate;
    a first supporting member configured to support a spline shaft or a spline nut fitted on the spline shaft rotatably but immovably in the axial direction, and attached to the pressure plate;
    a second supporting member configured to support the spline nut or the spline shaft rotatably but immovably in the axial direction, and attached to the fixed plate;
    a rotary motor attached to the fixed plate and configured to rotate the screw via the spline shaft and the spline nut;
    a first torque transmitting mechanism configured to transmit a torque of the rotary motor to the spline nut or the spline shaft supported by the second supporting member attached to the fixed plate; and a second torque transmitting mechanism configured to transmit a torque that is generated on the spline shaft or the spline nut supported by the first supporting member attached to the pressure plate, to the screw, wherein:

the first supporting member is provided with a first positioning mechanism configured to adjust a mounting position of the first supporting member with respect to the pressure plate;

the second supporting member is provided with a second positioning mechanism configured to adjust a mounting position of the second supporting member with respect to the fixed plate;

the first supporting member and the second supporting member include holes formed therein for axial-center checking, rods being inserted through the holes; and the holes are formed in a manner that the rods smoothly pass through the holes when an axial center of the spline nut and an axial center of the spline shaft coincide with each other, and the rods do not smoothly pass through the holes when the axial center of the spline nut and the axial center of the spline shaft do not coincide with each other.

2. The injection device according to claim 1, wherein:
the first positioning mechanism is configured to adjust the mounting position of the first supporting member with respect to the pressure plate along a plane orthogonal to the axial direction; and the second positioning mechanism is configured to adjust the mounting position of the second supporting member with respect to the fixed plate along a plane orthogonal to the axial direction.

3. The injection device according to claim 1, wherein:
the first positioning mechanism and the second positioning mechanism each include adjusting screw members and screw supporting members configured to support the adjusting screw members by screw-engagement with the adjusting screw members;

the pressure plate and the fixed plate are each provided with abutment members that abut against distal ends of the adjusting screw members; and by changing amounts of projection of the adjusting screw members from the respective screw supporting members by rotation of the adjusting screw members, the mounting positions of the first supporting member and the second supporting member are adjusted.

4. The injection device according to claim 1, wherein:
in mounting the first supporting member and the second supporting member, the mounting positions of the first supporting member and the second supporting member are adjusted by the first positioning mechanism and the second positioning mechanism in a manner that the rods are inserted through the holes formed in the first supporting member and the second supporting member.

5. An axial-center position adjusting method of adjusting axial-center positions of a spline shaft and a spline nut of an injection device, the injection device including the spline shaft configured to rotate a screw inserted into a cylinder, and the spline nut fitted on the spline shaft, wherein:
the injection device further includes:
a first supporting member attached to a pressure plate that supports the screw rotatably but immovably in an axial direction, and configured to support the spline shaft or the spline nut rotatably but immovably in the axial direction;

a second supporting member attached to a fixed plate that supports an injection motor and receives a reaction force of the pressure plate, the injection motor being configured to move the pressure plate in the axial direction, and configured to support the spline nut or the spline shaft rotatably but immovably in the axial direction;

a rotary motor attached to the fixed plate and configured to rotate the screw via the spline shaft and the spline nut;

a first torque transmitting mechanism configured to transmit a torque of the rotary motor to the spline nut or the spline shaft supported by the second supporting member attached to the fixed plate; and a second torque transmitting mechanism configured to transmit a torque that is generated on the spline shaft or the spline nut supported by the first supporting member attached to the pressure plate, to the screw, the first supporting member is provided with a first positioning mechanism configured to adjust a mounting position of the first supporting member with respect to the pressure plate, the second supporting member is provided with a second positioning mechanism configured to adjust a mounting position of the second supporting member with respect to the fixed plate, the first supporting member and the second supporting member include holes formed therein for axial-center checking, rods being inserted through the holes, and the holes are formed in a manner that the rods smoothly pass through the holes when an axial center of the spline nut and an axial center of the spline shaft coincide with each other, and the rods do not smoothly pass through the holes when the axial center of the spline nut and the axial center of the spline shaft do not coincide with each other, the method comprising the step of:
in mounting the first supporting member and the second supporting member, adjusting the mounting positions of the first supporting member and the second supporting member by use of the first positioning mechanism and the second positioning mechanism in a manner that the rods are inserted through the holes formed in the first supporting member and the second supporting member.

6. The axial-center position adjusting method according to claim 5, further comprising the steps of:
adjusting the mounting position of the first supporting member with respect to the pressure plate along a plane orthogonal to the axial direction, by means of the first positioning mechanism; and adjusting the mounting position of the second supporting member with respect to the fixed plate along a plane orthogonal to the axial direction, by means of the second positioning mechanism.

7. The axial-center position adjusting method according to claim 5, wherein the first positioning mechanism and the second positioning mechanism each include adjusting screw members and screw supporting members configured to support the adjusting screw members by screw-engagement with the adjusting screw members, and the pressure plate and the fixed plate are each provided with abutment members that abut against distal ends of the adjusting screw members, the method further comprising the step of:
turning the adjusting screw members so as to change amounts of projection of the adjusting screw members from the respective screw supporting members, and thereby adjusting the mounting positions of the first supporting member and the second supporting member.

8. The axial-center position adjusting method according to claim 5, further comprising the step of:

after adjustment of the mounting positions of the first supporting member and the second supporting member, fastening the first supporting member to the pressure plate and fastening the second supporting member to the fixed plate, by fastening screw members.

* * * * *